DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 9

T904,015

PHOTOGRAPHIC SENSITIZING DYES HAVING IMPROVED SOLUBILITY

Leslie G. S. Brooker, deceased, by Nancy G. Broderson, executor, 183 Main St. 14604, and Donald W. Heseltine, Kodak Park 14650, both of Rochester, N.Y.

Filed Mar. 30, 1972, Ser. No. 239,776

**Int. Cl. G03c *1/12***

U.S. Cl. 96—131

No Drawing. 29 Pages Specification

Cyanine and merocyanine dyes having improved solubility are provided. These dyes contain at least one solubilizing group having the formula $$-(CH_2)_n-(O)_m-\overset{\overset{\displaystyle X}{\|}}{C}-NH-R$$

wherein $n$ is 0, 1 or 2; $m$ is 0 or 1; X is oxygen or sulfur, and R is a carboxyalkyl group which typically has 2 to 5 carbon atoms and includes 1 or 2 carboxyl moieties. Light sensitive silver halide emulsions containing such dyes are also provided. The feature dye-solubilizing group can be attached to the heterocyclic nuclei of the dyes, such as to a heterocyclic nitrogen atom, or to the methine chain linking the heterocyclic nuclei.